United States Patent
Wang et al.

(10) Patent No.: US 10,375,981 B2
(45) Date of Patent: *Aug. 13, 2019

(54) HIGH-MOISTURE TEXTURIZED PEANUT PROTEIN AND A PREPARATION METHOD THEREOF

(71) Applicant: Institute of Food Science and Technology, Chinese Academy of Agricultural Sciences, Beijing (CN)

(72) Inventors: Qiang Wang, Beijing (CN); Li Liu, Beijing (CN); Jinchuang Zhang, Beijing (CN); Song Zhu, Beijing (CN); Hongzhi Liu, Beijing (CN); Aimin Shi, Beijing (CN); Hui Hu, Beijing (CN)

(73) Assignee: Institute of Food Science and Technology, Chinese Academy of Agricultural Sciences (CN)

( * ) Notice: Subject to any disclaimer, the term of this patent is extended or adjusted under 35 U.S.C. 154(b) by 10 days.

This patent is subject to a terminal disclaimer.

(21) Appl. No.: 15/791,845

(22) Filed: Oct. 24, 2017

(65) Prior Publication Data

US 2018/0360084 A1 Dec. 20, 2018

(30) Foreign Application Priority Data

Jun. 15, 2017 (CN) .......................... 2017 1 0452463

(51) Int. Cl.
*A23L 25/00* (2016.01)
*A23L 5/00* (2016.01)
(Continued)

(52) U.S. Cl.
CPC ................. *A23L 25/30* (2016.08); *A23J 3/14* (2013.01); *A23J 3/225* (2013.01); *A23L 5/00* (2016.08); *A23P 30/20* (2016.08); *A23V 2002/00* (2013.01)

(58) Field of Classification Search
CPC ............. A23L 25/30; A23L 30/20; A23L 5/00
(Continued)

(56) References Cited

U.S. PATENT DOCUMENTS 4,042,715 A  8/1977 Wenger et al.
4,099,455 A  7/1978 Wenger et al.
(Continued)

FOREIGN PATENT DOCUMENTS

CN  101889627 A  11/2010
CN  102028094 A  4/2011
(Continued)

OTHER PUBLICATIONS

Final Office Action; dated May 10, 2018 for U.S. Appl. No. 15/841,726.
(Continued)

*Primary Examiner* — Helen F Heggestad
(74) *Attorney, Agent, or Firm* — Mendelsohn Dunleavy, P.C.

(57) ABSTRACT

High-moisture TPP and its preparation by crushing and mixing low-temperature defatted peanut protein powder and extrusion texturizing at 60° C. to 80° C. in the feeding zone, 90° C. to 100° C. in the mixing zone, 120° C. to 160° C. in the melting zone, 90° C. to 150° C. at the cooling die, and 50° C. to 100° C. in the molding zone. Water is added online during extrusion to adjust the moisture content to 45% to 60%. The cooled product is high-moisture TPP that has a moisture content of 55% or more, bright white color, fragrant taste, abundant fibrous structure, is immediately edible, and can be used as a substitute for meat in the manufacture of chicken dices, pulled meat, vegetarian sausage and the like. The method fully utilizes raw materials, has almost no waste, is continuous, has a high process (Continued)

integration, and low energy consumption, and it can enhance the value of peanut protein powder.

19 Claims, 1 Drawing Sheet

(51) Int. Cl.
*A23P 30/20* (2016.01)
*A23J 3/14* (2006.01)
*A23J 3/22* (2006.01)

(58) Field of Classification Search
USPC ....... 426/629, 632, 506, 512, 516, 517, 518, 426/520
See application file for complete search history.

(56) References Cited

U.S. PATENT DOCUMENTS

| | | | |
|---|---|---|---|
| 9,314,045 | B2 | 4/2016 | Nishimura et al. |
| 9,526,267 | B2 | 12/2016 | Anderson et al. |
| 2012/0156355 | A1 | 6/2012 | Milne et al. |

FOREIGN PATENT DOCUMENTS

| | | |
|---|---|---|
| CN | 102028095 A | 4/2011 |
| CN | 105104707 A | 12/2015 |
| EP | 1493337 A2 | 1/2015 |

OTHER PUBLICATIONS

Cuan, Z., et al., "Effects of Defatted Peanut Flour Property on Structure of Extruded Product." Journal of Chinese Cereals and Oils Association, Mar. 2007, vol. 22, No. 2, pp. 53-59; English abstract provided on pp. 58-59.

Zhang, C., et al., "Effect of protein contents on the quality properties of texturized peanut protein products." Scientia Agricultura Sinica, 2007, 40(8), pp. 1753-1759.

Lin, S., H. E. Huff, and F. Hsieh. "Extrusion process parameters, sensory characteristics, and structural properties of a high moisture soy protein meat analog." Journal of Food Science 67.3 (2002): 1066-1072.

Rehrah, Djaafar, et al. "Extrusion parameters and consumer acceptability of a peanut-based meat analogue." International journal of food science & technology 44.10 (2009): 2075-2084.

Osen, Raffael, et al. "High moisture extrusion cooking of pea protein isolates: raw material characteristics, extruder responses, and texture properties." Journal of Food Engineering 127 (2014): 67-74.

Shanshan, L., et al., "Technical Study on Twin—Screw Extrusion Texturization of High—Temperature Defatted Peanut Meal." Journal of the Chinese Cereals and Oils Association, May 2011, vol. 26, No. 5., pp. 83-86, English abstract located on p. 86.

Non-Final Office Action; dated Jan. 18, 2018 for U.S. Appl. No. 15/841,726.

"Pea Protein Isolate Product," Abstract, as retrieved from: https://www.researchgate.net/publication/40541053_PEA_PROTEIN_ISOLATE_PRODUCTION.

Figure 1
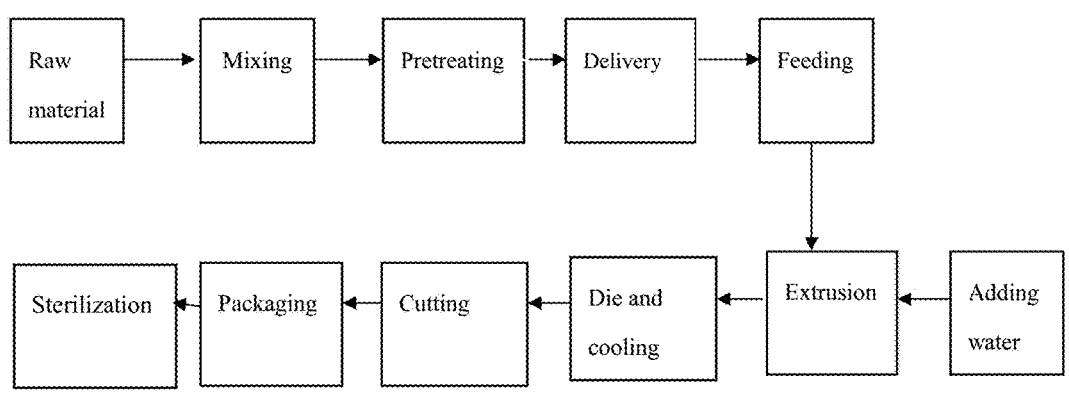
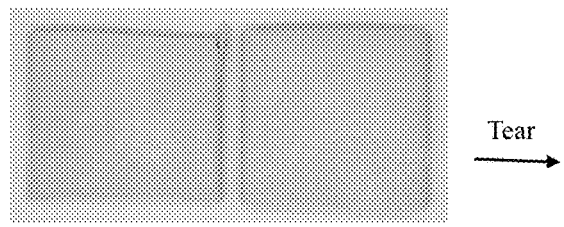
Figure 2A
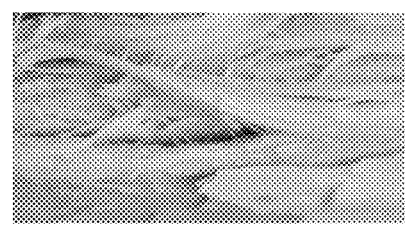
Figure 2B

HIGH-MOISTURE TEXTURIZED PEANUT PROTEIN AND A PREPARATION METHOD THEREOF

TECHNICAL FIELD

The present invention relates to a high-moisture texturized peanut protein (TPP) and a preparation method thereof.

BACKGROUND ART

China is the world's largest producer and consumer of peanut with a peanut yield of 16.44 million tones in 2015, which accounts for about 40.77% of the world's total yield. 50% to 65% of the total peanut yield is used for oil preparation. Defatted peanut cake (meal) is a by-product obtained after pression or extraction of peanut for oil preparation, in which the protein content is up to 50%-70% (dry basis). It is estimated that about 3 million or more tons of peanut cake (meal) per year need to be developed and utilized in China, which can be converted into 1.5 million or more tons of peanut protein and becomes the third largest vegetable protein source in China after wheat and soybean. For a long time, due to backward traditional oil-producing technologies, proteins in defatted peanut meal are seriously denatured, and thus the defatted peanut meal is unfit for consumption and can only be used as feed or fertilizer, resulting in a huge waste of protein resources. In recent years, with the increasing emphasis on peanut proteins, low denatured peanut proteins of high quality with a nitrogen soluble index of 70% or more can be obtained while high-quality peanut oil is obtained by improving traditional oil-producing technologies and using oil-producing technologies such as low-temperature pressing method, low temperature prepressing-water dissolving method, aqueous enzymatic extraction method, high-efficiency extraction method and the like. At present, peanut protein products are mainly divided into three types: peanut protein powder, peanut protein concentrate and peanut protein isolate. Peanut protein powder has a bright white color and a digestibility coefficient of up to 90%, also does not have cholesterol and flatulence factors, and its characteristic amino acid, arginine, has the effect of anti-aging. Therefore, the peanut protein powder is of great development and utilization value.

Food extrusion technology is one of the most important food-processing technologies, in which processes such as mixing, stirring, crushing, heating, cooking, puffing and molding and the like are integrated, and it has the features such as high efficiency, low energy consumption, low emission, low cost, high-temperature short-time, less nutrient loss and the like. The use of the extrusion technology in food production has a history of more than 70 years, wherein, production of texturized vegetable protein (TVP) using vegetable proteins such as soybean protein, peanut protein, gluten protein, whey protein and the like as main raw materials is an important application of the extrusion technology in the food industry. The TVP produced by the extrusion method has excellent functional properties such as water absorption, oil absorption and the like, a cholesterol content of zero, and a function of preventing "modern civilization diseases" such as hypertension, obesity, cardiovascular and cerebrovascular diseases and the like; and it can be used as additive of meat products or meat analogues for human consumption. The TVP can be divided into high-protein TVP (the protein content is higher than 70%) and low-protein texturized protein (the protein content is between 50% and 55%) according to the protein content in raw materials; can be divided into low-moisture TVP (the moisture content is lower than 35%) and high-moisture TVP (the moisture content is higher than 45%) according to the moisture content; and can be divided into ordinary TVP (having a small amount of fibrous structures) and fibrous TVP (having an obvious fibrous structure) according to the fibrous structure of the products. Ordinary low-moisture TVP is the main product form in the international and domestic markets. High-moisture TVP is a kind of new product, and, based on analysis of its organizational structure and texture, it has more excellent properties as compared with puffed product. The high-moisture TVP has a longer fiber length, a more delicate structure, a more uniform texture, and higher elasticity and tenacity, which can be eaten directly and is an upgrading product of the puffed product.

A Chinese patent titled "Method for producing TPP by utilizing hot-pressed peanut cake (meal)" (Publication No. CN102028094A) discloses a method for preparing puffed TPP using hot-pressed peanut cake (meal) as a raw material. Although nutritive materials belonging to the class of vitamin are added during the processing, the nutrients in peanuts are seriously destroyed in the subsequent high temperature drying process. A Chinese patent titled "Fibrous TVP and a preparation method thereof" (Publication No. CN102028095A) discloses a method for preparing a low-moisture fibrous TVP using grain protein, protein isolate and starch as the raw materials and an extruder provided with an outlet mould for form the fibrous structure, wherein, after rehydration, the fibrous TVP has appearance and characteristics similar to animal muscles, and can be torn into strips. However, the prepared product needs to be rehydrated for consumption, the fibrous structure is not abundant, and it is mainly used as an additive for meat products. A Chinese patent titled "Method for producing ready-to-eat vegetarian meat by using soybean protein isolate" (Publication No. CN101889627A) discloses a method for producing high-moisture texturized soybean protein (TSP) using soybean protein isolate. However, the soybean protein isolate has a high manufacturing cost and contains flatulence factors; and the TVP product has a beany flavor, which reduces the consumer acceptability.

In view of this, the present invention has been proposed.

SUMMARY OF THE INVENTION

The purpose of the present invention is to provide a method for producing high-moisture TPP without additives and a product prepared using the same.

The technical solutions of the present invention are as follows:

A method for producing high-moisture TPP comprises the following steps:

1) low-temperature defatted peanut protein powder is crushed and mixed well;

2) extrusion texturization: the material obtained in step 1) is subjected to an extrusion texturization treatment (for example, using a screw extruder), wherein extrusion temperatures are as follows: 60° C. to 80° C. (the temperature of the the feeding zone of the extruder barrel), 90° C. to 100° C. (the temperature of the mixing zone), 120° C. to 160° C. (the temperature of the melting zone), 90° C. to 150° C. (the temperature of the cooling die), and 50° C. to 100° C. (the temperature of the molding zone); water is added online during extrusion to adjust the material moisture, so that water and the material are mixed well in the barrel, and the moisture content of the material during extrusion is 45% to 60% (mass fraction); the product obtained after extrusion molding is cooled to give the high-moisture TPP.

Further, in order to achieve thorough mixing of the low-temperature defatted peanut protein powder and sufficient contact between material molecules (all of which facilitate subsequent extrusion texturization treatment to form the high-moisture TPP), the low-temperature defatted peanut protein powder is preferably crushed into small particles, and sieved by a 60 to 80 mesh sieve. Further more, the mixed material may be loaded into a sealed container, and equilibrated for a period of time. The equilibration time may generally be 20 to 30 hours, for example 24 hours.

A mixer can be used in step 1) for chopping and mixing material fully.

Further, the extrusion temperatures in step 2) are as follows: 60° C. to 70° C. (the feeding zone), 90° C. to 98° C. (the mixing zone), 135° C. to 155° C. (the melting zone), 90° C. to 120° C. (the cooling die), and 50° C. to 80° C. (the molding zone).

In a specific embodiment of the present invention, the extrusion temperatures are as follows: 70° C. (the feeding zone), 98° C. (the mixing zone), 140° C. (the melting zone), 120° C. (the cooling die), and 80° C. (the molding zone).

In a specific embodiment of the present invention, in step 2), the moisture content of the material during extrusion is adjusted to 54% (mass fraction).

Further, the screw rotation speed is 180 to 250 r/min and the feeding speed is 100 to 160 g/min during the extrusion of step 2). Preferably, the screw rotation speed is 180 to 210 r/min and the feeding speed is 140 to 160 g/min. In a specific embodiment of the present invention, the screw rotation speed is 200 r/min and the feeding speed is 150 g/min.

Further, the above-mentioned method for producing high-moisture TPP further comprises the step of cutting and cooling the extrusion-molded material after the extrusion texturization treatment, for example, cutting the material extruded from the extruder into 15 to 20 cm, to obtain the high-moisture TPP with obvious fibrous structure. The cut high-moisture TPP is loaded into a vacuum packaging bag, which is vacuumized, sealed and then cooled in a fluidized bed.

The extrusion texturization treatment according to the present invention may be carried out by using a twin-screw extruder.

Preferably, the screw assembly mode of the twin-screw extruder used in the present invention is a high shear combination in which a kneading block with a shear angle of 45° is selected as a screw shear element; there are four shear sections; and the screw shear elements and the delivery elements are installed on a screw with a length-diameter ratio of 24:1 alternately.

Preferably, the cooling is carried out by passing the extrusion-molded material obtained after the extrusion texturization treatment through a molding zone having a length of about 1 m, a width of about 80 cm and a height of about 3 cm to obtain the high-moisture TPP. Further, the temperature of the molding zone is 50° C. to 80° C.

Further, the low-temperature defatted peanut protein powder according to the present invention has a crude protein content equal to or more than 55%, and a crude fat content equal to or less than 7%.

The present invention also comprises the high-moisture TPP prepared by the method described above.

The present invention also comprises the application of the above-mentioned high-moisture TPP in food processing.

The high-moisture TPP according to the present invention can be used for producing food such as semi-finished products (for example, "vegetarian chicken dices" which are used as garnish of Kung Pao Chicken, barbecued meat, chaffy dish meat, and meat pie for fast food), and end products (for example, vegetarian protein meat, pulled meat, vegetarian sausage) and the like.

The high-moisture TPP obtained according to the present invention improves the beany flavor of products prepared using soybeans as a raw material, and overcomes the problem that it is difficult to prepare high-moisture TPP when peanut protein is used as a raw material. Moreover, the product does not need rehydration any more, has a good taste, no beany flavor, a natural color, uniformity, no charring color and better flavor and is nutrient rich.

Like high-moisture TSP, the high-moisture TPP according to the present invention has a bright white color, a smooth surface, a soft texture and a fragrant taste, and is ready to eat. The high-moisture TPP has an obvious fibrous structure, and has a texturizing degree of 1.0 to 1.2, a fiber strength of 0.4 to 0.6 kg, an elasticity of 0.8 to 0.95, a hardness of 18 to 30.5 kg, and a chewiness of 13 to 18 ($\times 10^3$).

Further, the moisture content of the high-moisture TPP according to the present invention is 50% to 60%.

The texturizing degree, fiber strength, elasticity, hardness, and chewiness can be detected by the methods commonly used in the art.

The high-moisture TPP according to the present invention can be used as a substitute for meat in the manufacture of chicken dices, pulled meat, vegetarian sausage and the like. The method according to the present invention has the following advantages: full utilization of raw materials, almost no waste emission, continuous production, high process integration level, and low energy consumption, and it is conducive to improving the additional value of peanut protein powder.

The raw materials of the present invention are commercially available.

The present invention has the following beneficial effects:

(1) The present invention may be achieved by only using intrinsic ingredients of peanut without addition of any exogenous ingredient.

(2) The use of special extrusion process shortens the high temperature treatment time, and greatly reduces the destruction of nutritional ingredients in peanut.

(3) The moisture content of the material during extrusion can be up to 55% or more, and the obtained high-moisture TPP is rich in fibrous structure.

(4) The product does not need rehydration, and may be eaten directly as meat analogues.

BRIEF DESCRIPTION OF THE DRAWINGS

FIG. 1 is a process flow diagram of the method according to the present invention.

FIG. 2A is an appearance diagram of the high-moisture TPP obtained according to the present invention.

FIG. 2B is an internal structure diagram of the high-moisture TPP obtained according to the present invention.

SPECIFIC MODES FOR CARRYING OUT THE EMBODIMENTS

The following examples are intended to illustrate the present invention, but are not intended to limit the scope of the present invention. The operations involved in the examples are conventional technical operations in the art, unless otherwise specified. The implementation conditions in the examples may be further adjusted according to specific experimental conditions or plant conditions, and conditions that are not specified are generally conditions used in conventional experiments.

The following extrusion texturization treatment was carried out by using FMHE36-24 twin screw extruder.

The following texturizing degree, fiber strength, elasticity, hardness, chewiness, color, specific mechanical energy (SME) were detected by the methods recited in references such as Li Shujing (2014), Zhang Bo (2010), Zhang Cuan (2007) and the like (see References).

The low-temperature defatted peanut protein powder used below was purchased from Qingdao Changshou Food Co., Ltd., and the basic physical and chemical properties were as follows:

| Crude protein content % (×5.46 dry basis) | Crude fat content % (dry basis) | Moisture % |
|---|---|---|
| 60.75 ± 0.748 | 6.95 ± 0.044 | 5.82 ± 0.057 |

Example 1

A preparation method of a high-moisture TPP comprises the following steps:

(1) crushing raw material: the low-temperature defatted peanut protein powder was crushed into small particles, and was sieved by a 60 to 80 mesh sieve, and then weighed to take 5 kg of raw material;

(2) pre-mixing raw material: 5 kg of raw material was mixed in a mixer for 5 min in batches, and equilibrated for 24 hours;

(3) assembling screw elements: high shear combination, that is, a kneading block with a shear angle of 45° is selected as a screw shear element, and the assembled screw was placed into an extruder barrel and fixed firmly;

(4) pre-heating the extruder: a twin-screw extruder was preheated after start of the extruder; the predetermined temperature in each zone of the extruder was as follows: 70° C. in the feeding zone, 98° C. in the mixing zone, 140° C. in the melting zone, 120° C. at the cooing die, and 80° C. in the molding zone; the screw rotation speed was adjusted to 200 r/min, and the feeding speed was 150 g/min;

(5) adjusting moisture content of the material: water was added online during extrusion, so that water and the material were mixed well in the barrel, and the final moisture content of the material was 54% by mass;

(6) extrusion molding: after adjustment of the moisture content, the material was extrusion-molded in the extruder and then passed through a molding zone having a length of about 1 m, a width of about 80 cm and a height of about 3 cm to give the high-moisture TPP;

(7) cutting: the high-moisture TPP was cut into long strips with a length of about 20 cm by a hydraulic cutter at the outlet of the extruder; and (8) packaging: long strips of the high-moisture fibrous texturized peanut protein were quickly packaged with a vacuum bag, and stored in a refrigeration storage at 4° C.

The detection results of the high-moisture TPP prepared in this example were as follows:

| Texturizing degree | Fiber strength (kg) | Elasticity | Hardness (kg) | Color ΔE | Chewiness (×10$^3$) | Specific mechanical energy (SME)/ (kJ · kg$^{-1}$) |
|---|---|---|---|---|---|---|
| 1.20 | 0.49 | 0.92 | 30.32 | 27.29 | 17.81 | 656.66 |

Example 2

A preparation method of high-moisture TPP was used. The specific operation steps of this method were the same as those in Example 1 except that in step (4), the temperature in the melting zone was 160° C.

The detection results of the high-moisture TPP prepared in this example were as follows:

| Texturizing degree | Fiber strength (kg) | Elasticity | Hardness (kg) | Color ΔE | Chewiness (×10$^3$) | Specific mechanical energy (SME)/ (kJ · kg$^{-1}$) |
|---|---|---|---|---|---|---|
| 1.02 | 0.46 | 0.85 | 26.91 | 28.68 | 13.15 | 628.45 |

Example 3

A preparation method of high-moisture TPP was used. The specific operation steps of this method were the same as those in Example 1 except that in step (5), the moisture content of the material during extrusion was 62% (mass fraction).

The detection results of the high-moisture TPP prepared in this example were as follows:

| Texturizing degree | Fiber strength (kg) | Elasticity | Hardness (kg) | Color ΔE | Chewiness (×10$^3$) | Specific mechanical energy (SME)/ (kJ · kg$^{-1}$) |
|---|---|---|---|---|---|---|
| 1.14 | 0.53 | 0.86 | 18.18 | 23.80 | 8.61 | 562.87 |

The appearance and internal structure of the high-moisture TPP obtained in Examples 1-3 were shown in FIGS. 2A and 2B, respectively.

Comparative Example 1

A preparation method of high-moisture TPP was used. The specific operation steps of this method were the same as those in Example 1 except that in step (1), the low-temperature defatted peanut protein powder was crushed and sieved by a 30 mesh sieve.

The detection results of the high-moisture TPP prepared in this comparative example were as follows:

| Texturizing degree | Fiber strength (kg) | Elasticity | Hardness (kg) | Color ΔE | Chewiness (×10$^3$) | Specific mechanical energy (SME)/ (kJ · kg$^{-1}$) |
|---|---|---|---|---|---|---|
| 0.90 | 0.33 | 0.66 | 13.10 | 29.01 | 4.79 | 701.19 |

Comparative Example 2

A preparation method of high-moisture TPP was used. The specific operation steps of this method were the same as those in Example 1 except that in step (4), the temperature in the melting zone was 110° C.

The detection results of the high-moisture TPP prepared in this comparative example were as follows:

| Texturizing degree | Fiber strength (kg) | Elasticity | Hardness (kg) | Color ΔE | Chewiness (×10³) | Specific mechanical energy (SME)/ (kJ · kg⁻¹) |
|---|---|---|---|---|---|---|
| 0.98 | 0.37 | 0.78 | 26.08 | 28.37 | 14.23 | 632.67 |

Comparative Example 3

A preparation method of high-moisture TPP was used. The specific operation steps of this method were the same as those in Example 1 except that in step (5), the moisture content of the material during extrusion was 40% (mass fraction).

The detection results of the high-moisture TPP prepared in this comparative example were as follows:

| Texturizing degree | Fiber strength (kg) | Elasticity | Hardness (kg) | Color ΔE | Chewiness (×10³) | Specific mechanical energy (SME)/ (kJ · kg⁻¹) |
|---|---|---|---|---|---|---|
| 0.93 | 0.86 | 0.58 | 33.05 | 30.38 | 20.19 | 816.89 |

The comparison results of the high-moisture TPP prepared in Examples 1-3 and Comparative Examples 1-3 were shown in Table 1:

TABLE 1

Comparison results

| No. | Color | Surface smoothness | Fibrosis degree | Fiber Strength | Elasticity | Hardness | Chewiness |
|---|---|---|---|---|---|---|---|
| Example 1 | bright white | Smooth | Strong | Relatively strong | Strong | Relatively high | Relatively high |
| Example 2 | yellow-white | Relatively smooth | Relatively strong | Relatively strong | Relatively strong | Relatively low | Relatively high |
| Example 3 | bright white | Smooth | Relatively strong | Relatively strong | Relatively strong | Relatively low | Relatively low |
| Comparative Example 1 | yellow-white | Rough | Relatively weak | Weak | Weak | Low | low |
| Comparative Example 2 | yellow-white | Relatively rough | Relatively weak | Weak | Relatively weak | Relatively low | Relatively high |
| Comparative Example 3 | dull yellow | Relatively rough | Relatively weak | Strong | Weak | High | High |

REFERENCES

1. LI Shujing. Study on relationship between thermal properties of raw materials and texture properties of extrusion texturized proteins [D]. Chinese Academy of Agricultural Sciences, 2014.
2. ZHANG Cuan. Study on peanut protein extrusion texturization technology and underlying mechanisms [D]. Northwest A & F University, 2007.
3. Zhang Bo. Characterization of the function of screws in a twin screw extruder [D]. Chinese Academy of Agricultural Sciences, 2010.

While the present invention has been described in detail by way of general description, specific embodiments and tests, it will be apparent to a person skilled in the art that based on the present invention, modifications and improvements may be made without departing from the spirit and scope of the present invention. Accordingly, such modifications or improvements that are made without departing from the spirit of the present invention are intended to be within the scope of the present invention.

What is claimed is:

1. A method of preparing a high-moisture fibrous Texturized Peanut Protein, consisting essentially of the following steps:
    A) low-temperature defatted peanut protein powder is crushed optionally sieved by a 60 to 80 mesh sieve, and mixed well;
    A') optionally loading the mixed material of step A) into a sealed container, and equilibrating the mixed material for a period of time;
    B) the material obtained in step A) is subjected to an extrusion texturization treatment using an apparatus having a screw, a feeding zone, a mixing zone, a melting zone, a molding zone and a cooling die at the following extrusion temperatures: 60° C. to 80° C. in the feeding zone, 90° C. to 100° C. in the mixing zone, 135° C. to 155° C. in the melting zone, 90° C. to 150° C. at the cooling die, and 50° C. to 100° C. in the molding zone; and wherein water is added online during extrusion to adjust the moisture content of the material, so that the moisture content of the material during extrusion is 45% to 60% and a rotation speed of the screw is 180 to 250 r/min; and
    C) cooling the product obtained after extrusion molding to provide the high-moisture fibrous Texturized Peanut Protein.

2. The method according to claim 1, wherein, one of:
    i) in step A), the low-temperature defatted peanut protein powder is crushed into small particles, and sieved by a 60 to 80 mesh sieve;
    ii) the method includes loading the mixed material of step A) into a sealed container, and equilibrating the mixed material for a period of time;
    iii) the low-temperature defatted peanut protein powder has a crude protein content greater than or equal to 55% on a dry basis, and a crude fat content equal to or less than 7% on a dry basis.

3. The method according to claim 2, wherein the extrusion temperatures in step B) are 60° C. to 70° C. in the feeding zone, 90° C. to 98° C. in the mixing zone, 90° C. to 120° C. at the cooling die, and 50° C. to 80° C. in the molding zone.

4. The method according to claim 2, wherein the extrusion temperatures in step B) are as follows: 70° C. in the feeding zone, 98° C. in the mixing zone, 140° C. in the melting zone, 120° C. at the cooling die, and 80° C. in the molding zone.

5. The method according to claim 2, wherein, in step B), the moisture content of the material during extrusion is adjusted to 54%.

6. A method of food processing utilizing the high-moisture fibrous Texturized Peanut Protein produced according to the method of claim 5, comprising a step of producing food by combining the food with the fibrous Texturized Peanut Protein produced according to the method of claim 5.

7. The method according to claim 2, wherein the feeding speed is 100 to 160 g/min during the extrusion of step B).

8. The method according to claim 1, wherein the extrusion temperatures in step B) are 60° C. to 70° C. in the feeding zone, 90° C. to 98° C. in the mixing zone, 90° C. to 120° C. at the cooling die, and 50° C. to 80° C. in the molding zone.

9. The method according to claim 1, wherein the extrusion temperatures in step B) are as follows: 70° C. in the feeding zone, 98° C. in the mixing zone, 140° C. in the melting zone, 120° C. at the cooling die, and 80° C. in the molding zone.

10. The method according to claim 1, wherein, in step B), the moisture content of the material during extrusion is adjusted to 54%.

11. The method according to claim 1, wherein the screw rotation speed is 180 to 250 r/min and the feeding speed is 100 to 160 g/min during the extrusion of step B).

12. A method of food processing utilizing the high-moisture fibrous Texturized Peanut Protein produced according to the method of claim 11 comprising the step of producing food by combining the food with the Texturized Peanut Protein produced according to the method of claim 11.

13. The method according to claim 1, wherein the screw rotation speed is 180 to 210 r/min and the feeding speed is 140 to 160 g/min.

14. The method according to claim 1, wherein the screw rotation speed is 200 r/min and the feeding speed is 150 g/min.

15. The method according to claim 1, wherein the extrusion texturization treatment is carried out by using a twin-screw extruder.

16. The method according to claim 1, wherein the screw assembly mode is a high shear combination: a kneading block with a shear angle of 45° is employed as a screw shear element; there are four shear sections; and the screw shear elements and the delivery elements are installed on a screw with a length to diameter ratio of 24:1 alternately.

17. A method of preparing high-moisture Texturized Peanut Protein, consisting essentially of the following steps:
   A) low-temperature defatted peanut protein powder is crushed optionally sieved by a 60 to 80 mesh sieve, and mixed well;
   A') optionally loading the mixed material of step A) into a sealed container, and equilibrating the mixed material for a period of time;
   the material obtained in step A) is subjected to an extrusion texturization treatment using the following extrusion temperatures: 60° C. to 80° C. in the feeding zone, 90° C. to 100° C. in the mixing zone, 120° C. to 160° C. in the melting zone, 90° C. to 150° C. at the cooling die, and 50° C. to 80° C. in the molding zone; and wherein water is added online during extrusion to adjust the moisture content of the material, so that the moisture content of the in material during extrusion is 45% to 60%;
   C) cooling the product obtained after extrusion molding to provide the high-moisture Texturized Peanut Protein; and
   wherein the cooling is carried out by passing the extrusion molded material obtained after the extrusion texturization treatment through a molding zone having a length of about 1 m, a width of about 80 cm and a height of about 3 cm.

18. The method according to claim 17, wherein
   i) in step A), the low-temperature defatted peanut protein powder is crushed into small particles, and sieved by a 60 to 80 mesh sieve;
   ii) includes loading the mixed material of step A) into a sealed container, and equilibrating the mixed material for a period of time; and
   iii) the low-temperature defatted peanut protein powder has a crude protein content greater than or equal to 55% on a dry basis, and a crude fat content equal to or less than 7% on a dry basis.

19. High-moisture fibrous Texturized Peanut Protein, characterized in that, it has a texturizing degree of 1.0 to 1.2, a fiber strength of 0.4 to 0.6 kg, an elasticity of 0.8 to 0.95, a hardness of 18 to 30.5 kg, and a chewiness ($\times 10^3$) of 13 to 18; and/or a moisture content of 50% to 60%.

* * * * *